June 25, 1968  W. V. MORRIS  3,389,760
ROLLING CUTTERS FOR ROCK FORMATIONS MOUNTED
ON SIMPLE BEAM BEARINGS
Filed Sept. 1, 1966  4 Sheets-Sheet 1

WILFORD V. MORRIS
*INVENTOR.*

BY Roy N. Smith, Jr.
ATTORNEY

June 25, 1968

W. V. MORRIS 3,389,760

ROLLING CUTTERS FOR ROCK FORMATIONS MOUNTED
ON SIMPLE BEAM BEARINGS

Filed Sept. 1, 1966

WILFORD V. MORRIS
INVENTOR.

BY Roy H. Smith, Jr.
ATTORNEY

June 25, 1968 W. V. MORRIS 3,389,760
ROLLING CUTTERS FOR ROCK FORMATIONS MOUNTED
ON SIMPLE BEAM BEARINGS
Filed Sept. 1, 1966 4 Sheets-Sheet 4
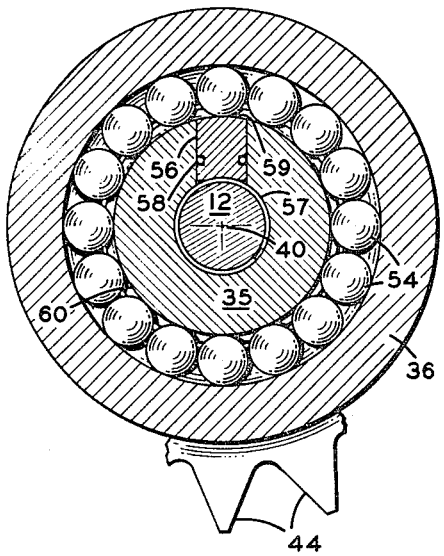
FIGURE 6
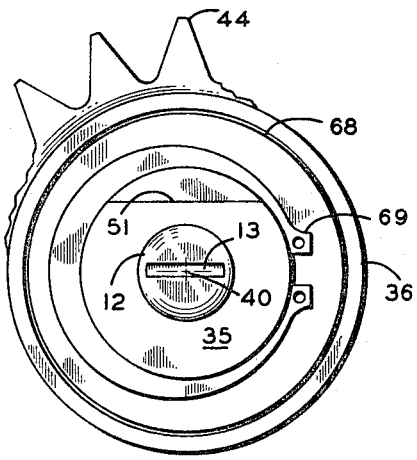
FIGURE 7
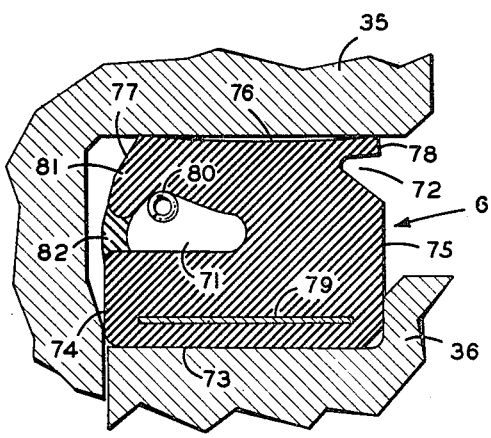
LOADED
FIGURE 8
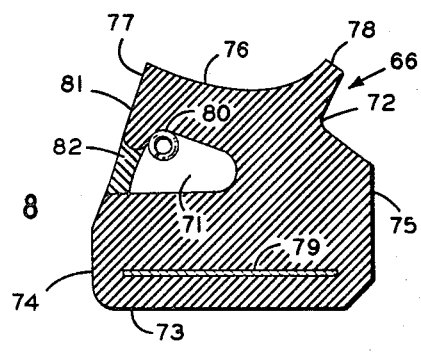
RELAXED
WILFORD V. MORRIS
*INVENTOR.*
BY Roy H. Smith, Jr.
ATTORNEY United States Patent Office 3,389,760
Patented June 25, 1968

3,389,760
ROLLING CUTTERS FOR ROCK FORMATIONS
MOUNTED ON SIMPLE BEAM BEARINGS
Wilford V. Morris, Houston, Tex., assignor to
Hughes Tool Company, Houston, Tex., a corporation of Delaware
Filed Sept. 1, 1966, Ser. No. 576,650
3 Claims. (Cl. 175—371)

ABSTRACT OF THE DISCLOSURE

A sealed and lubricated assembly wherein a load pin is the central member and extends between two saddle arms, each end being received in an opening in one of the arms. An inner bearing in the form of a bushing fits snugly over the load pin, and is prevented from rotating by a shoulder fit with the inside surface of one or both of the saddle arms. The cutter, in the form of an approximately cylindrical shell having cutting structure on its outer surface, is rotatably mounted on the inner bearing and is fixed axially thereon by a thrust element of the bearing between the two members.

Figure 1:
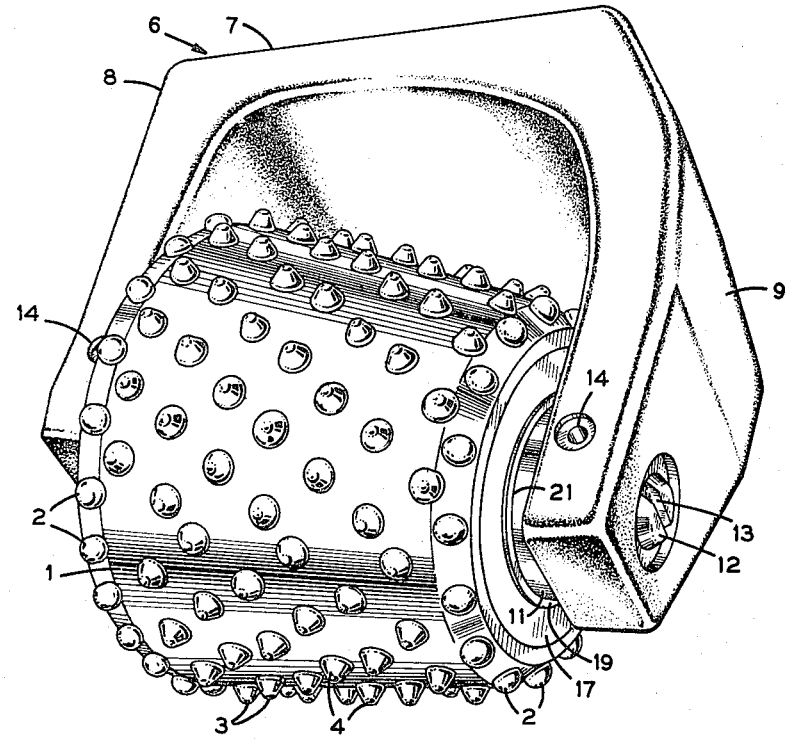

In this assembly the load pin is locked to both saddle arms by transverse keeper pins, thereby avoiding the possibility of arm bending which could bind the cutter or could cause the inner bearing to disengage from one of the saddle arms. A wear bushing fits between the end of the load pin and the opening in each saddle arm so that such openings do not become wallowed out, making the saddle reuseable with many cutter assemblies. Additional saddle arm protection is provided by the outward radial projection of the cutter and inner bearing, beyond the corresponding outward projection of the outer saddle arm.

The seal rings are interposed between cutter and inner bearing member at opposite ends of the bearing, and such seals are protected from erosion by the drilling fluid and cuttings, at one end by a labyrinth and at the other by a protective washer. The seal rotates with the cutter and makes only double line sealing contact with the inner bearing.

---

The present invention lies in the field of rolling cutters for rock formations, and in particular to relatively large rolling cutters mounted on bearings supported at both ends. A number of such cutters together with their bearings and the saddles in which cutter and bearing are supported and mounted on a rotary cutter head and are used to form tunnels, vertical holes and inbetween variants of relatively large size, e.g., from three feet in diameter upwardly.

In developing the present invention, the undersigned applicant initially approached the design problem by attempting to exploit his experience in the design of rolling cutter rock bits of somewhat smaller size, those used in drilling holes for oil wells and the like. While a certain amount of this small bit experience could be successfully utilized, it was quickly discovered that the larger bits involved several unique problems to which the corresponding solutions were not obvious. One of these problems was the mounting of the cutters and their bearings for ready replacement, when the cutting and bearing structures become worn without replacing the rotary head and saddle supports. Another was the mounting of the saddle support in a rigid manner, as early experimental work with separate fasteners demonstrated that cap screws and other threaded fasteners are highly likely to become jarred or broken loose, thereby not only causing inefficient operation of the cutters but sometimes also causing complete loss of the cutters in the hole. A third problem was providing a bearing structure having built into it means for prolonging the bearing life to equal that of the cutting structure, as the early experimental work showed that bearings utilizing only the traditional balls and rollers operating in registering raceways in the cutter and its inner bearing wore out well before the cutting structure on the outside of the cutter, largely because cuttings from the formation worked their way into the bearing.

Still another problem which developed during the experimental work was the need to keep costs low by minimizing the number of specifically different cutter designs used on any one bit, this problem in turn resulting in the problem of designing and mounting a universal cutter so that a multiplicity of them can be mounted to disintegrate the entire bottom of a hole. A similar problem was designing and mounting such cutters to minimize tracking.

A general problem was to make such cutters and bearings as simple and inexpensive to manufacture as possible, avoiding design features requiring extra or difficult machining operations as much as possible, and also where possible avoiding unnecessary metallurgical steps.

The objects of this invention are to furnish solutions to the above problems, resulting in a cutter and bearing subassembly which is of rugged and simple construction, is inexpensive in price because it is inexpensive to manufacture, is simply and ruggedly secured to a rotary head without the use of threaded connections, likewise includes no threaded connections in its own internal organization, can be made in a minimum number of designs and yet can be mounted to cut the entire bottom and preferably without tracking, includes means to prolong the life of its bearing to equal the life of the cutting structure, and is secured to the rotary head so that the head and the saddle supports connecting the subassembly to the head can be re-used many times, such objects being taken singly or in various combinations, preferably all together.

In general, these objects and others are achieved in the present invention by utilizing a somewhat conical or tapered rolling cutter having cutting structure on its outer surface and a generally cylindrical bearing opening extending throughout its length. The cutter is mounted on an inner bearing in the form of a thick sleeve or bushing extending the full length of the cutter opening and projecting from both ends, bearing members being used between the cutter and inner bearing to transmit both radial and thrust loads and also to lock the cutter on the inner bearing, the thrust members being loaded into their races through a radial opening in the inner bearing and closed with a plug which is unique in itself in that its outer, bearing surface is a spherical surface having the minimum radius of the raceway in which the thrust members are disposed.

The projecting ends of the inner bearing include shoulders which engage similar shoulders on the inner surfaces of the depending legs of a saddle in which the subassembly is to be mounted, the shoulder engagement being used only to prevent rotation of the inner bearing. To secure the subassembly to the saddle arms, a relatively large load pin is disposed in the internal opening which extends the length of the inner bearing and projects from each end into axially aligned openings in the saddle arms, preferably with a wear bushing to insure reusability of the saddle. This load pin is preferably secured to the saddle by a pair of spring-like keeper pins, such pins being in the form of an oversize sleeve having a longitudinal cut or slit therethrough and being compressed as it is driven into position to reduce the size of the slit. The assembly is lubricated with the aid of a grease gun and a lubrication fitting disposed in an axial passage connecting the bearing space with one end of the inner bearing member. A seal ring is provided in a counterbore in each end of the cutter, each such seal having a pair of inwardly extending resilient fingers which wipe against the outer surface of the inner bearing. Each seal is shrouded against cuttings and drilling fluid, one by a labyrinth and the other by a covering washer.

Figure 2:
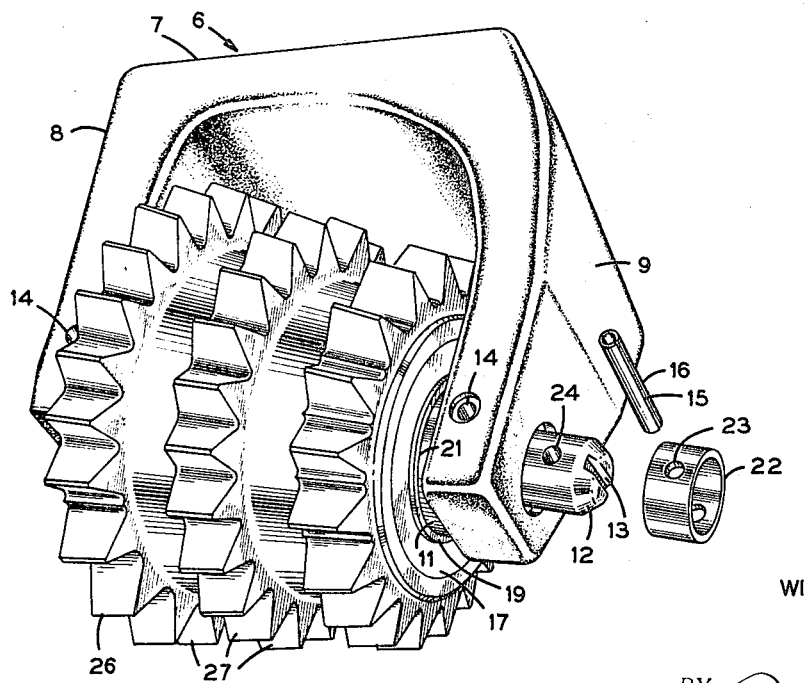
Figure 3:
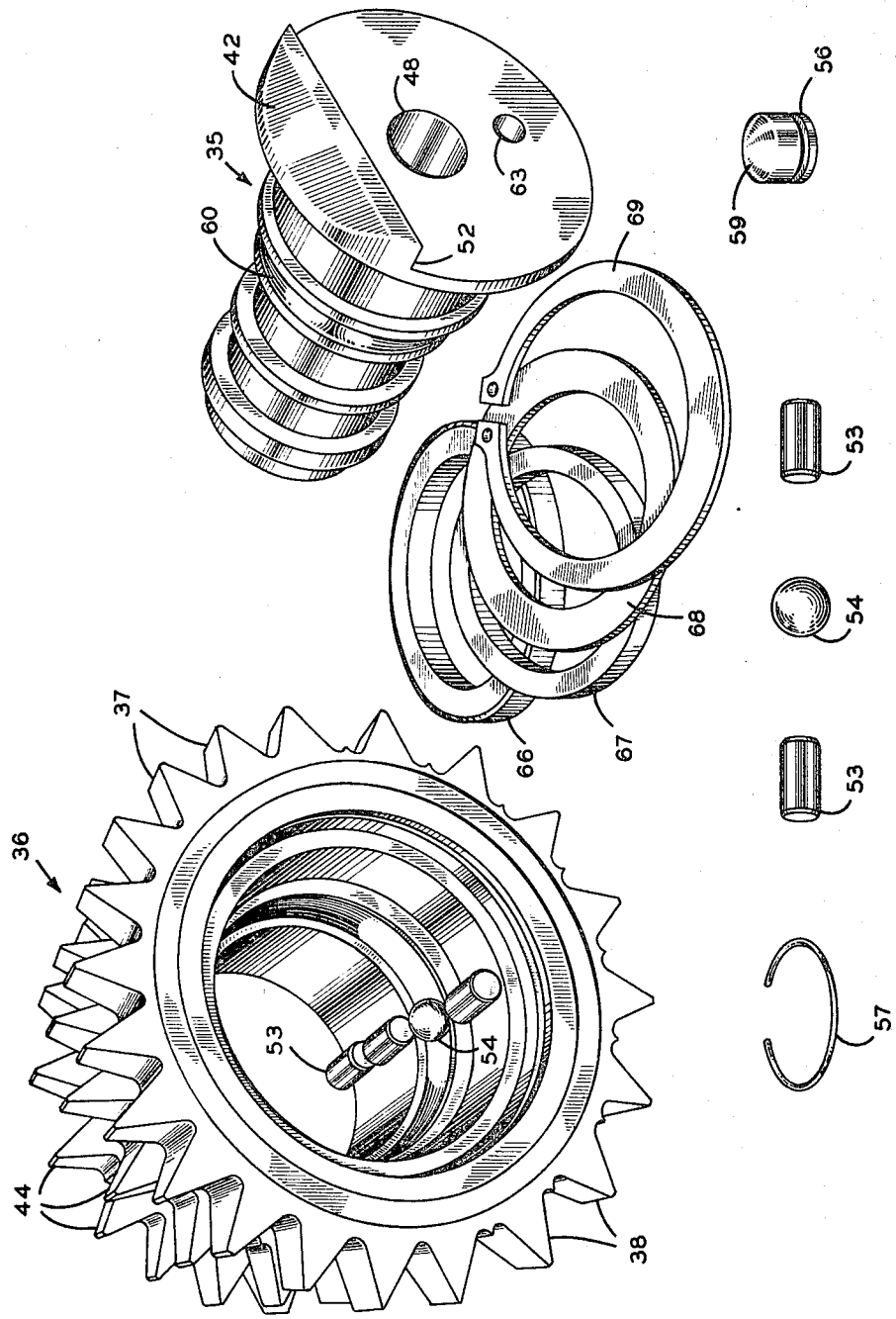
Figures 4, 5:
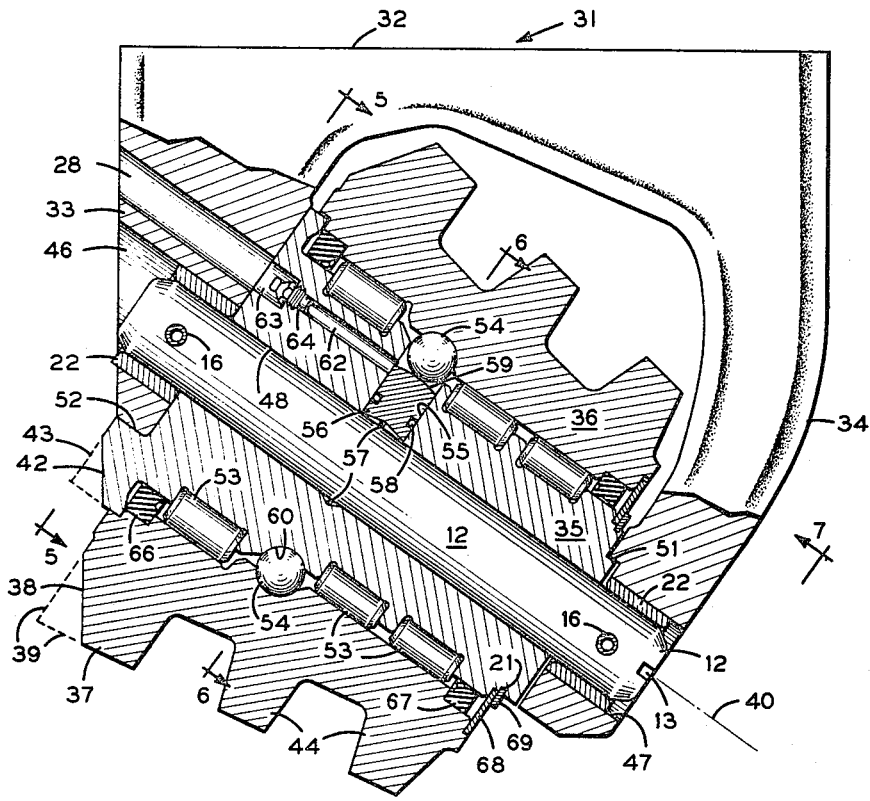

This construction and other structural details which accomplish the above stated objects will become more apparent from the following description, considered together with the accompanying drawing, in which drawing:

FIGURE 1 is a perspective view of a cutter and bearing subassembly of the invention mounted in a saddle, the cutter of this figure being one utilizing tungsten carbide inserts for the cutting structure, FIGURE 2 is a perspective view of a second cutter and bearing subassembly mounted in a saddle, the cutter of this figure having longitudinally crested steel teeth which are integral with the steel shell of the cutter and protrude outwardly therefrom, this view showing the load pin used to support the inner bearing partially removed from its assembly position, and also showing a keeper pin and a separate wear bushing which fits between the load pin and one of the saddle arms, FIGURE 3 is a perspective view of the separate parts making up the cutter and bearing subassembly of the invention, only representative balls and rollers being illustrated, FIGURE 4 is a longitudinal section of the subassembly of FIGURES 2 and 3 assembled in a mounting saddle, FIGURE 5 is a cross section of the same apparatus taken on the sectioning plane and looking in the direction of the arrows marked 5—5 in FIGURE 4, this view showing the flat shouldered fit of the inner bearing to the saddle arm and also showing one of the keeper pins used to secure the load pin to the saddle arm, FIGURE 6 is a correspondingly numbered cross section taken on FIGURE 4, this view being taken through the center of the ball bearing, FIGURE 7 is an end view taken as indicated by the lines and arrows of FIGURE 4, modified for clarity by eliminating the saddle arm, and FIGURE 8 is a cross section through one side of a seal used in the invention, the figure including views of the seal in both its relaxed condition and as assembled between the cutter and inner bearing of FIGURE 5.

Turning to the drawing, FIGURE 1 shows an assembly of a cutter and bearing of the invention in a saddle arm used to secure the subassembly to a rotary head (not shown). Cutter 1 has for its cutting structure a multiplicity of small inserts of cemented tungsten carbide press fitted into drilled holes in the cutter body. Two forms of such inserts are used, hemi-spherical ended inserts 2 at the inner and outer ends of the cutter and conical ended inserts 3 for all intermediate rows, such conical inserts being slightly rounded at the very extremities 4 of their cutting tips.

Several distinctions over the insert type small bit cutters will be noted by those familiar with the art. Cutter 1 has a smooth outer surface, whereas each cutter of a small bit has alternating lands and grooves with the inserts being mounted only in the lands. In the cutter of FIGURE 1 the inserts are disposed in overlapping rows so that as the cutter is roller over the bottom of a hole or the working face of a tunnel the inserts 2 and 3 cut overlapping tracks and the cutter as a whole will disintegrate the rock over its full length. This mode of operation is not possible with the land-and-groove type cutter, which requires the cooperation of three cutters of different geometries to produce the overlapping and full disintegration of bottom achieved with the single cutter of FIGURE 1.

Another distinction is that the inserts 2 and 3 of FIGURE 1 protrude further from the cone shell than the inserts of the prior art 3-cone bits, the amount of protrusion being equal to that of the prior art inserts plus the thickness of the land eliminated in the cutter of the invention. At the same time the inserts 3 have been modified to the conical form illustrated, making them broader at the base and narrower in the tip than the prior art hemispherical ended inserts. These two features enable the cutter 1 to penetrate a wider range of formations, including the moderately hard and abrasive formations as well as the extremely hard and abrasive rocks cut by prior art inserts.

Another distinction, one not readily apparent from the drawing, lies in the fact that the outer surface of cone shell 1 is not carburized whereas cutters of the prior art using insert type cutting structure are carburized on the exterior surface prior to mounting the inserts. Such carburization is widely believed to be necessary to prevent overly rapid erosion of the cone metal, in particular erosion of the metal around the inserts which could cause the inserts to become loosened and fall out or break off. On the contrary, while the cutter 1 of the invention becomes eroded in the blank areas between inserts there is no corresponding erosion of the cone metal immediately surrounding the inserts. The metal of the cone retains its grip or bite on the inserts, and there has been no experience of gross loss of inserts by erosion. The erosion that does occur actually appears to be beneficial, as it forms hollows in the surface of the cutter which promote better flow of the cuttings away from the formation being drilled.

The saddle 6 of FIGURE 1 is generally U-shaped, having a flat rectangular base 7 and a pair of depending legs 8 and 9. It is adapted to be mounted on a rotary head having a mounting surface normal to the direction of drilling, the preferred method of attachment being by laying the flat base 7 against the rotary head and welding the members together around the complete periphery of the base, the saddle being oriented so that the axis of rotation of cutter 1 lies in a radial plane or is only slightly cocked from such a plane (i.e., a plane which intersects the axis of rotation of the rotary head, which is also the axis of the hole or tunnel). The saddle also holds the cutter somewhat cocked with respect to the flat base 7 of the saddle, with the small end of the cutter disposed at a greater distance from such base than the large end of the cutter.

The only other members visible in FIGURE 1 are seen only in part, at the inside leg 9 of the saddle. Element 11 is the inner bearing on which the cutter rotates, and load pin 12 fits within inner bearing 11. The load pin has a slot 13 in each end to facilitate both axial movement in assembly or removal and to make possible a rotating of the pin to line up a radial opening therethrough (not visible) with corresponding openings 14 in arms 8 and 9 of the saddle. When such openings are aligned, a split keeper or retainer pin 16 (see FIGURE 2) is driven into them to secure the load pin to the saddle. Also visible are portions of an annular washer 17 used to secure a seal ring (see seal rings 66 and 67 in FIGURES 3, 4 and 8) in place and snap ring 19, which fits into a groove 21 in inner bearing 11 and projects outwardly to underlie washer 17 and secure it in place.

FIGURE 2 illustrates another assembly utilizing a saddle 6 like that shown in FIGURE 1, such saddles being used to mount "inside" cutters, i.e., those disposed inwardly from the sidewall of the hole and thus having no gage maintaining function. The only part of this assembly differing from that shown in FIGURE 1 is the cutter 26. This cutter has alloy steel teeth 27 and is intended for disintegrating rock formations which are not as strong and abrasive as the formations cut by cutters using tungsten carbide inserts. The cutter illustrated employs longitudinally crested teeth in spaced apart circumferential rows, and it will be apparent that there will be uncut rims of rock between such rows. To disintegrate such rims and at the same time use a minimum of different cutter designs, a number of cutters identical to cutter 26 are disposed on a rotary cutter head in an annular band but with alternate cutters set slightly further from the axis of the head than other cutters in the band. With this arrangement the rock rims not cut by one group of cutters will be cut by those set at a different radius, and thus all of the cutters as a whole cooperate to disintegrate the complete hole bottom or tunnel face.

Shown separately in FIGURE 2 is a wear bushing 22 and one of the keeper pins 16 used to secure load pin 12 to the saddle arms 8 and 9. Pin 16 is hollow and has a longitudinal slit 15 throughout its length, and may also be described as a longitudinaly slotted sleeve pin. In unassembled condition its outside diameter is somewhat greater than the openings which receive it, namely opening 20 (see FIGURE 5) in the saddle arm 8 or 9, opening 23 in wear bushing 22, and opening 24 in load pin 12. As pin 16 is driven through these openings, slit 15 is reduced in width and the tendency of the pin to resume its natural condition holds the assembly firmly together.

FIGURES 3–7 illustrate both the internal organization of a cutter and journal subassembly of the invention and the manner in which such subassembly is held in a mounting saddle. The only major difference between this assembly and that shown in FIGURE 2 is that the latter is an inside cutter assembly while that shown in FIGURES 3–7 is an outside or gage cutter assembly, one in which the cutter disintegrates that portion of the bottom of a hole immediately adjoining the sidewall and also bears against the sidewall to maintain the gage of the hole. The saddle 31 of this assembly has a base 32 designed to be secured by welding to a flat surface on a rotary head, a stubby outer arm 33 with the triangular cross section illustrated, and an elongated inner arm 34 which is somewhat bent underneath base 32, the net result of thus altering the arms by comparison with those of the FIGURES 1 and 2 saddles being to provide a means for mounting cutter 36 at a steeper pin angle, e.g., a greater angle with respect to a plane transverse to the direction in which a hole or tunnel is being formed. In addition, the heel teeth 37 of cutter 36 are formed with hardfaced gage surfaces 38 which swing through a most advanced position in which they are parallel to the axis of the bit and contact the sidewall of the hole, whereas the corresponding teeth of the inner cutters have no such gage surface, as indicated by their phantom outline 39. Similarly, the outermost surface 42 of inner bearing or journal 35 is provided with a hardfaced shirttail 42 in the gage cutter assembly while the corresponding part of the journal for the inner cutters has no such surface and has the end configuration shown by phantom outline 43.

Except for the differences just noted and one other not illustrated the following description applies to both inside and outside cutter assemblies, as they are otherwise alike in having the same components and proportions. The non-illustrated distinction is that two somewhat different gage cutters are required, differing only in the dispositions and dimensions of their cutting teeth. This is necessary because all of the gage cutters operate on the same portion of the bottom or face, and if all cutters were identical there would be uncut rims between the rows of teeth 37 and 44. The gage cutter not shown has teeth so proportioned and disposed as to disintegrate such rims.

Load pin 12 is inserted in the assembly of FIGURE 4 from either of the axially aligned openings in the saddle, opening 46 in outer arm 33 or opening 47 in inner arm 34, through wear bushings 22 fitted into both openings, and at the same time is inserted through the longitudinal opening 48 in journal member 35. Keepers or springs 16 are then driven through the previously mentioned aligned openings in the saddle arms, wear bushings and load pin to complete the assembly. Cutter 36 is secured to its journal 35 prior to mounting it on the load pin, and all that need be done with this subassembly when inserting the load pin is to hold it in aligned position.

As the cutter and journal subassembly is placed in position inside the saddle 31, inside shoulder 51 on journal 35 is brought into registering position with the like shoulder of inside saddle arm 34, and outside shoulder 52 is similarly brought into registering position with the corresponding shoulder of outside saddle arm 33. These shoulders are most simply formed as flat surfaces which are tangent to circles about the axis 40 of the assembly, but obviously any other type of shoulder would serve the same purpose of preventing rotation of journal 35 except one in which the only flat surface of the shoulder is perpendicular to the axis of rotation.

Between cutter 36 and its inner bearing 35 are three roller bearings 53 and one ball bearing 54, the rollers and balls of each set rolling in the indicated registering raceways. Radial loads are transmitted from cutter to inner bearing largely through the rollers 53, while balls 54 transmit both radial and thrust loads. In addition, the balls serve to lock the cutter against axial movement on the journal.

In assembling cutter 36 on its journal 35, which is accomplished before the subassembly is mounted in saddle 31, the rollers 53 are first placed in position as shown on the outside of journal 35, being temporarily held in such position with the aid of some thick lubricating grease. Outer seal ring 66 is also placed in position on journal 35, in the relative position illustrated in FIGURE 4. Cutter 36 is then placed over the journal so that seal ring 66 is forced into the pocket provided for it in the outer end of the cutter and with the cutter raceways registering with those on the journal, and balls 54 are loaded into position through opening 55 in journal 35. When the full set of balls have been assembled, they are held in place by inserting plug 56 in opening 55. A snap ring 57 prevents the plug from falling back into main opening 48 of the journal while the assembly is being fitted into the saddle, and an O-ring 58 girthing the plug prevents the leakage of lubricant between its periphery and the wall of opening 55.

As indicated in FIGURES 3, 4 and 6, ball plug 56 terminates at its outer end in aspherical cap 59. The radius of cap 59 is equal to the minimum radius of the ball raceway 60 on inner bearing 35, through which radius the sectioning plane for FIGURE 6 passes in FIGURE 4. This proportioning of the outer end of plug 56 permits balls 54 to roll over such end and into raceway 60 without any bumping and without jamming of the balls in the raceway. In passing over raceway 60, the balls contact the full semicircular cross-section of such raceway whereas in passing over the plug 56 there is only point contact, a shifting point on the ball rolling over a circle at the center of end cap 59.

The other significant part of the assembly is the lubricating system, which includes longitudinal passage 62 connecting the bearing space with the outside surface of journal 35, the counterbored end 63 of passage 62, lubricant fitting 64 in the passage, and seals 66 and 67. The lubricant passage is disposed in alignment with a passage 28 through outer leg 33 of the saddle so that a lubricant loading device may be inserted through the aligned passages to engage fitting 64 and pump lubricant into the bearing.

Seals 66 and 67 differ only in dimensions, and hence a description of one will also be a description of the other. Outer seal 66 is disposed so that it is protected against slipping outwardly from is place by the illustrated configuration of the journal and cutter, and this same configuration to some extent also serves as a labyrinth seal which keeps most of the drilling fluid, cuttings and other matter away from the seal. In the absence of a corresponding configuration at the inner end of the cutter, similar protection is furnished for inner seal 67 by a flat washer 68 seated on the indicated shoulder of journal 35 and in the indicated counterbored opening of cutter 36. Washer 68 is held in place by a snap ring 69 which is partially seated in the illustrated groove 21 in the outer surface of journal 35 and partially overlies the washer to prevent it from moving axially inwardly.

The seal rings 66 and 67 are annular members disposed coaxially with the axis of rotation 40 of the cutter, and are force fitted into the indicated rectangular annular sockets provided for them on the inside of the cutter so that they rotate with the cutter and maintain rotational sealing contact with the journal. Clearances are provided, as illustrated, so that the only rubbing contact with the journal is against the cylindrical outer surface of the journal; there is no rubbing contact between the radially extending end faces of the seal and any corresponding surfaces of the journal. There is also a press fit against the outer surface of the journal, but the form of the seal and the manner in which it engages the two members prevents it from becoming operationally reversed, so that it would remain fixed on the bearing and rub against the rotating cutter.

The structure and operation of a particular form of seal used successfully in an embodiment of the present invention may be better seen in FIGURE 8, which shows minor cross sections of seal 66 in both its relaxed position and its loaded or assembled position. From these it may be seen that the seal in its natural condition is roughly square in cross section, is largely composed of rubber or rubber and asbestos, and has two pockets 71 and 72 formed from the ends. Outside surface 73 and end surfaces 74 and 75 are flat, but the inside sealing surface 76 is circular in cross-section, terminating at its ends in lips 77 and 78.

In pocket 71, which is the deeper of the two pockets, there is disposed a coil spring 80. This spring bears against the inside wall of the pocket, tending to push the flap or overhanging portion 81 of the rubber inwardly toward the axis of the seal. The spring forms a complete ring, and anything causing it to be pushed outwardly to a larger diameter than it occupies in its relaxed position will cause an increased inward force to be exerted through flap 81 and lip 77. Embedded in the rubber of the seal adjacent outer surface 73 is a "bone" or flat ring 79 of sheet metal which adds to the stiffness of the seal.

It may be mentioned that the particular seal as thus far described is not by itself an invention of the undersigned applicant, but on the other hand is a commercially available product of the prior art. Since the end 74 in which the spring 80 is disposed in assembly so that it faces toward the mud and away from the lubricated bearing, the seal has been modified in a maner to prevent cuttings and other foreign matter from becoming packed into pocket 71. This has been accomplished by providing an annular closure 82 for the pocket, this closure being of a rubber material similar to that in the body of the seal and being vulcanized to the rubber on both sides of the opening. Prior to adding closure 82, the pocket 71 was filled with a finely divided plastic material to increase the sealing force exerted through the inside surface 76 of the seal.

As the seal is compressed between journal 35 and cutter 36, pockets 71 and 72 become smaller in volume and spring 80 becomes stretched, causing a sealing contact on journal 35 by inside surface 76 of the seal. The concavity of this surface almost disappears, but there is still a slight dish and the sealing force on the journal is all exerted through lips 77 and 78. This is a highly desirable effect, as it is known that superior sealing is obtained if the available force is concentrated at one or two lines or a very small area of contact rather than distributing the same sealing force over a large area.

While only anti-friction bearings and a particular form of seal have been shown and described, and these constitute portions of the preferred or best contemplated mode of carrying out the invention because they have resulted in an assembly which has proven to be highly efficient in the drilling of rock, other bearings and seals known to the prior art are also embraced within the present inventive concept. It is possible, for instance, to make all or part of the bearing of the friction journal type, wherein there is rubbing contact between the inside surface of the cutter and the outside surface of the journal without the interposition of balls, rollers or similar anti-friction bearings. Rollers 53 or one or two sets of them could be eliminated, for instance, and the space vacated by them could be utilized to provide a thicker journal member or a thicker cutter shell, or a combination of both. The confronting faces of the contacting members can be of hardfaced materials found advantageous in cutter bearings of the prior art, or more recently disclosed bearing materials can be used, e.g., the alternating bands of carburized alloy steel and silver alloy taught by Whanger in U.S. Patent 3,235,316, or the inlaid plastic bearings of Scales, as taught in his U.S. application S.N. 429,730, filed Feb. 2, 1965.

Any seal may be used which adequately excludes contaminants from the bearings and retains the lubricant therein. One such seal believed to be operable in a very satisfactory manner with the present invention is of the O-ring type, as disclosed by Galle in his pending U.S. applications S.N. 506,654, filed Nov. 8, 1965, and S.N. 509,480, filed Nov. 24, 1965, the O-ring seals as thus employed being used with unusually high compressions.

Irrespective of the form of bearing or seal employed, it is an important part of the present invention to provide it with lubrication throughout the life of the cutting structure. Cutter and journal subassemblies with such lubrication last many more hours than those with inadequate or no lubrication. The bearings of well lubricated assemblies wear out at about the same time that the cutting structure becomes fully dulled, whereas in the bits with little or no lubrication the bearings wear out while there is still considerable life in the cutting structure.

It should be noted that in the overall assembly as described, the cutter and journal subassembly is so disposed and mounted in the saddle that it protects the saddle from wear and is repeatedly replaceable, when worn out, in the same saddle. The outer parts of the cutter and journal project outwardly beyond the saddle and absorb all the gage wear, effectively shrouding and protecting the outer arm of the saddle. Any tendency toward wear around the load pin is absorbed by the wear bushings, insuring that the openings in the saddle arms will not become wallowed out to an unusably large diameter.

I claim:

1. A replaceable journal and rolling cutter subassembly for a drill bit comprising a rolling cutter having a bearing opening extending longitudinally of the cutter from one end to the other and a journal in the form of a bushing disposed in the opening and extending throughout the length and projecting from both ends thereof, said cutter being secured on said bushing by antifriction radial bearings and anti-friction thrust bearings the latter of which also serves to lock the members together against relative longitudinal movement, each of the projecting ends of said bushing having a shoulder portion with a flat surface thereon by which said bushing is prevented from rotating, said subassembly also including means for injecting lubricant into said opening between the cutter and the bushing and an annular lubricant seal ring at each end of the opening, each said seal ring being compressed between and sealing against a pair of cylindrical surfaces on the cutter and bushing, one on each member and facing each other across the radial gap, and in which one end of said bushing includes a portion projecting radially outwardly and terminating in an annular outside corner and the corresponding end of said opening in the rolling cutter terminates in a counterbore portion with the surfaces thereof forming an annular inside corner, the surface of said inside corner being closely spaced from the corresponding surfaces on the outside corner of the bushing to form a labyrinth shrouding the seal at that end from cuttings and other contaminants that tend to wear and damage the seal, the opposite end of said bushing being of reduced diameter at the axial location where it emerges from said cutter opening to form an annular shoulder and at the same axial location the end of said cutter being counterbored to provide a second annular shoulder, said subassembly including an annular washer member seated on both said shoulders and bridging any gap therebetween, and a snap ring member surrounding said inner bearing and partially seated in a groove therein and partially underlying said washer to prevent an axial displacement of the washer, whereby the seal ring at that end of the cutter is shrouded from the wear and damage caused by the intrusion of cuttings and other contaminants.

2. A cutter assembly for a rotary head of a machine used to form big holes and tunnels in earthen formations, said assembly comprising a mounting saddle which is repeatedly reusable, a rolling cutter and journal subassembly, a load pin, a pair of wear bushings and keeper pin means securing the load pin to the mounting saddle, said saddle having a flat base adapted to be placed against a flat surface of a rotary head and to be secured thereto by welding about its periphery and a pair of legs depending from said base at the ends thereof, there being a pair of aligned openings in said legs and a flat surfaced shoulder on the inside of at least one of said legs, said pair of wear bushings being secured one in each of said openings, said load pin extending between the legs of said saddle with its ends disposed within said wear bushings, said keeper pin means extending transversely through aligned openings in said leg, wear bushing and load pin at each end thereof, said subassembly comprising a journal in the form of a bushing mounted on said load pin, a rolling cutter rotatably mounted on said journal, and a seal between said journal and cutter at each end of the cutter, at least one end of said journal having a flat surfaced shoulder registering with the like shoulder on the inside of said saddle leg to prevent rotation of said journal.

3. The assembly of claim 2 in which one end of each of said journal and rolling cutter project outwardly beyond the outer surface of the adjacent leg and are provided with a wear resistant coating to protect said leg from erosion during operation.

References Cited

UNITED STATES PATENTS

| | | | |
|---|---|---|---|
| 1,444,074 | 2/1923 | Hughes | 175—355 |
| 2,248,340 | 7/1941 | Catland | 175—359 |
| 2,990,025 | 6/1961 | Talbert | 175—378 X |
| 3,203,492 | 8/1965 | Lichte | 175—355 |
| 3,216,513 | 9/1965 | Robbins | 175—364 X |
| 3,299,973 | 1/1967 | Swart | 175—371 |
| 3,332,505 | 7/1967 | Schumacher | 175—372 |

FOREIGN PATENTS

| | | |
|---|---|---|
| 754,983 | 8/1956 | Great Britain. |

NILE C. BYERS, JR., *Primary Examiner.*